United States Patent [19]
Houkes

[11] Patent Number: 4,748,383
[45] Date of Patent: May 31, 1988

[54] DC-AC CONVERTER FOR IGNITING AND SUPPLYING A DISCHARGE LAMP

[75] Inventor: Henk Houkes, Oss, Netherlands

[73] Assignee: U. S. Philips Corporation, New York, N.Y.

[21] Appl. No.: 923,259

[22] Filed: Oct. 27, 1986

[30] Foreign Application Priority Data
  Nov. 4, 1985 [NL] Netherlands .................. 8503008

[51] Int. Cl.⁴ ............................................. H05B 41/24
[52] U.S. Cl. ........................... 315/248; 315/276; 315/283; 315/287; 315/344; 315/39; 315/57; 331/117 R; 331/117 FE
[58] Field of Search ...... 315/200 R, DIG. 7, DIG. 5, 315/274, 265, 266, 209 R, 213, 232, 242, 248, 344, 245, 244, 267, 283, 276, 284; 331/117 FE, 117 R

[56] References Cited

U.S. PATENT DOCUMENTS

| | | | |
|---|---|---|---|
| 4,245,178 | 1/1981 | Justice | 315/248 |
| 4,298,828 | 11/1981 | Justice et al. | 315/248 |
| 4,392,087 | 7/1983 | Zansky | 315/244 |
| 4,415,838 | 11/1983 | Houkes | 315/248 |
| 4,463,286 | 7/1984 | Justice | 315/244 |
| 4,647,820 | 3/1987 | Chermin et al. | 315/244 |

FOREIGN PATENT DOCUMENTS

| | | | |
|---|---|---|---|
| 3142613 | 5/1983 | Fed. Rep. of Germany | 315/248 |
| 0208503 | 5/1984 | Fed. Rep. of Germany | 315/248 |
| 0161361 | 12/1980 | Japan | 315/248 |

Primary Examiner—David K. Moore
Assistant Examiner—Michael J. Nickerson
Attorney, Agent, or Firm—David R. Treacy; Bernard Franzblau

[57] ABSTRACT

A DC-AC converter for igniting and supplying a low-pressure discharge lamp, e.g. an electrodeless low-pressure gas discharge lamp. The converter has two input terminals (9, 10) for connection to a d.c. voltage source. The input terminals are connected to a series arrangement controlled semiconductor switching element (12), a first coil (14) and a parallel circuit having the discharge lamp 15 in one of its branches. The control electrode and a main electrode of the controlled semiconductor switching element are connected together by means of a secondary winding (21) of a transformer (17) having a primary winding (16) that forms a part of the parallel circuit. The converter includes a starter circuit comprising a resistor (28) connected between a main electrode and the control electrode of the semiconductor switching element and a capacitor (29) coupled between the control electrode and one end of the secondary winding (21) of the transformer.

11 Claims, 1 Drawing Sheet

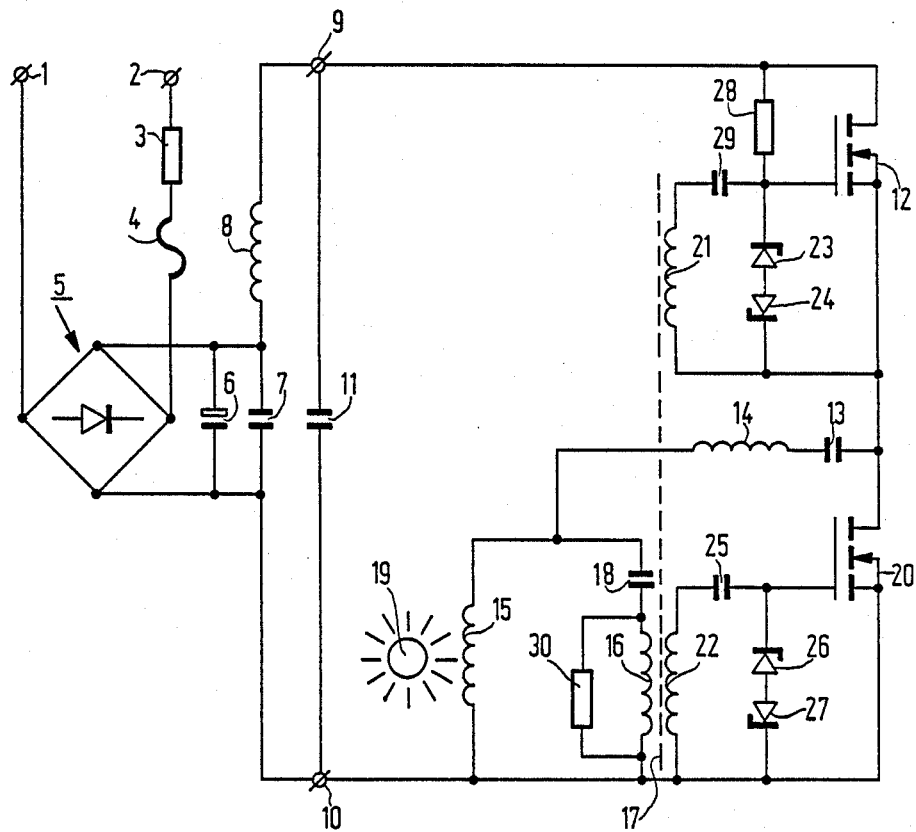

DC-AC CONVERTER FOR IGNITING AND SUPPLYING A DISCHARGE LAMP

BACKGROUND OF THE INVENTION

This invention relates to a DC AC converter for igniting and supplying a low-pressure discharge lamp. The converter is provided with two input terminals intended to be connected to a d.c. voltage source, the input terminals being connected together by means of a series arrangement of a semiconductor switching element having a control electrode, a first coil and a parallel circuit having the discharge lamp incorporated in one of its branches. The control electrode and a main electrode of the controlled semiconductor switching element are connected together by means of a secondary winding of a transformer whose primary winding forms part of the parallel circuit. A starter circuit is incorporated in the converter.

A DC AC converter of this type is known from U.S. Pat. No. 4,415,838 to applicant.

This converter energizes, for example, an electrodeless low-pressure discharge lamp having an operating frequency of at least 0.5 MHz or a compact low-pressure mercury discharge lamp. It has been found that the converter has a high efficiency.

In order to start the converter, a starter circuit is incorporated in the control circuit of a semiconductor switching element consisting, inter alia, of a series arrangement of a resistor and a capacitor connected to the input terminals of the converter. Furthermore, the starter circuit has a branch comprising a bidirectional breakdown element (diac) which is connected at one end to a junction between the said resistor and capacitor and at the other end to the control electrode of the semiconductor switch.

It has been found that the use of the capacitor and the said breakdown element in the starter circuit often gives rise to an increased level of radio interference. In fact, the said capacitor is charged over and over again via the resistor up to the breakdown level of the diac, whereafter a start pulse in the operating converter is supplied. Furthermore, it has been found that the breakdown current of the diac at higher temperature increases over the course of the operating time. For reliable starting a circuit is to be designed for a fairly high breakdown current which also flows through the said resistor. In that case extra thermal losses occur. This is a drawback, particularly if the converter and the lamp are integrated to form a compact unit.

SUMMARY OF THE INVENTION

It is an object of the invention to provide a DC-AC converter having a starter circuit such that interference signals are reduced as much as possible and which obviates the use of a breakdown element.

To this end a DC-AC converter of the type described in the opening paragraph, according to the invention, is characterized in that the starter circuit includes a resistor which is connected between the main electrode and the control electrode of the semiconductor switching element, and a capacitor is coupled between the control electrode and one end of the secondary winding of the transformer.

The starter circuit of the converter according to the invention obviates the use of a bidirectional breakdown element. During operation of the converter no interference signals are generated on the supply mains. The energy dissipation in the starter circuit is also greatly reduced during operation. The number of components required is further reduced as compared with the known circuit. Because of these properties the entire circuit of the converter can easily be integrated in a lamp base of a compact lamp, such as in the base of a fluorescent electrodeless low-pressure mercury discharge lamp.

The invention is based on the recognition that upon switching on the converter the capacitor arranged between the control electrode and a main electrode of the switching element is first charged until the voltage on the control electrode is sufficiently high to render the switching element conducting. As a result a much higher current suddenly flows through a resonant circuit which is incorporated in the series arrangement. This resonant circuit includes the parallel arrangement of the transformer primary winding and a capacitor in one branch and the lamp coil in the other branch. The parallel arrangement thus incorporates the winding of an electrodeless discharge lamp. The resonant circuit starts oscillating because of the flow of the suddenly much higher current. The primary winding incorporated in this circuit then takes over the drive of the semiconductor switching element. Any further starting pulses are then no longer applied to the switching element.

The capacitance of the capacitor in the starter circuit is chosen so that its impedance at the operating frequency of the converter is low. Preferably, a value is chosen for the staring resistor at which the thermal losses during operation are negligible.

The said semiconductor switching element is preferably a MOS-FET.

BRIEF DESCRIPTION OF THE DRAWING

The invention will be further described by way of example with reference to the accompanying drawing.

The drawing shows an embodiment of a DC-AC converter according to the invention having an electrodeless low-pressure mercury vapour discharge lamp connected thereto.

DESCRIPTION OF THE PREFERRED EMBODIMENT

The input terminals 1 and 2 are intended to be connected to an a.c. voltage source (220 V, 50 Hz). These terminals are connected via a current-limiting resistor 3 and a fuse 4 to a full-wave rectifier 5. The output voltage of this rectifier is smoothed by means of the capacitor 6. Together with the high frequency capacitor 7 and coil 8, capacitor 6 constitutes a mains interference suppression filter. The output terminals 9 and 10 of the rectifier are also the input terminals for the DC-AC converter, capacitor 11 of which constitutes the DC voltage source.

The input terminals 9 and 10 are connected together by means of a first series arrangement of a semiconductor switching element (power MOS-FET) 12, a capacitor 13, a coil 14 and a parallel arrangement of a coil 15 in one branch and a series connection of a primary winding 16 of a current transformer 17 and a capacitor 18 in the other branch. Coil 15 is coupled to the discharge path of an electrodeless discharge lamp, diagrammatically denoted by 19. Furthermore the circuit incorporates a second semiconductor switching element (power MOS-FET) 20, which is arranged in series with switching element 12 and is connected to terminal 10. The primary winding 16 is bridged by a resistor 30 for optimizing the phase of the feedback signal.

The transformer 17 has two secondary windings 21 and 22. Winding 21 forms part of the control circuit of the switching element 12 and connects the control electrode of 12 to a main electrode thereof. The ends of winding 21 are connected to a voltage-limiting circuit consisting of a series arrangement of two oppositely arranged Zener diodes 23 and 24. Winding 22 forms a part of the control circuit of switch 20 and is bridged via capacitor 25 by the series arrangement of the oppositely arranged Zener diodes 26 and 27.

The starter circuit for the converter forms a part of the control circuit of the POWER-MOS-semiconductor switching element 12. The starter circuit includes a resistor 28 which is connected between a main electrode and the control electrode of the element 12, as well as a capacitor 29 which is arranged between the said control electrode and one end of the secondary winding 21.

The circuit described operates as follows. If the terminals 1 and 2 are connected to an a.c. voltage source, the capacitors 6, 7 and 11 are quickly charged via the rectifier 5 up to the peak value of the a.c. voltage originating from the a.c. voltage source. The d.c. voltage is present across the series arrangement 28, 29, 21, 13, 14 and 15. The capacitors 29 and 13 are charged via resistor 28 until the voltage across capacitor 29 reaches a threshold at which the semiconductor switching element 12 becomes condutive. Then a much higher current flows through the elements 12, 13 and 14 as well as in the parallel circuit 15, 16 and 18. An oscillation is then produced in this circuit whereafter the transformer 17 renders the semiconductor element 12 non-conducting and renders switching element 20 conducting. This produces a current through capacitor 25 whereafter switching element 20 becomes non-conducting again and switching element 12 becomes condutive again and so forth.

In a practical embodiment the above-mentioned circuit elements have the approximate values as shown in the Table below:

TABLE

| | |
|---|---|
| capacitor 6 | 15 μF |
| capacitor 7 | 10 nF |
| capacitor 11 | 100 nF |
| capacitor 18 | 560 pF |
| capacitor 25 | 10 nF |
| capacitor 29 | 10 nF |
| coil 8 | 100 μH |
| coil 14 | 27 μH |
| coil 15 | 8 μH |
| resistor 28 | 20 MOhm |
| resistor 30 | 2.7 Ohm |
| resistor 3 | 4.7 Ohm |
| Zener voltages of each of the Zener diodes 23, 24, 26, 27 | 6.8 Volts |
| transformer | |
| primary winding 16 | 1 turn |
| secondary winding 21 | 10 turns |
| secondary winding 22 | 10 turns |

The electrodeless lamp (19) which is coupled to a circuit including the elements shown in the table above has a power of 18 W and is further described in the U.S. Pat. No. 4,415,838. The coil 15 is formed as a winding around a ferromagnetic core which is arranged centrally in a spherical discharge vessel.

The RC-time of the series resistor (3) of the rectifier 5 and the smoothing capacitor 6 is shorter than the RC time of the starter circuit 28 and 29. The starter circuit does not operate until after the d.c. voltage source has reached the peak value of the mains voltage. Generally favourable results were achieved with the above-mentioned circuit if the first-mentioned RC time was a factor of 500 to 1500 shorter than the second. At the values shown in the Table the first RC time was approximately a factor of 1300 shorter.

In an alternative embodiment the parallel circuit incorporates a low-pressure mercury vapour discharge lamp having a hook-shaped bent discharge tube instead of the electrodeless lamp 19. Coil 15 is then replaced by a series arrangement of the two electrodes present at the ends of the tube and a resistor having a positive temperature coefficient is arranged between the juxtaposed supply wires of the two electrodes.

What is claimed is:

1. A DC-AC converter for igniting and operating an electrodeless low-pressure discharge lamp having a lamp coil comprising:
   first and second input terminals for connection to a source of DC voltage,
   a transformer having a primary winding and a secondary winding,
   a controlled semiconductor switching element having first and second main electrodes and a control electrode,
   first means for connecting said lamp coil and the transformer primary winding in a parallel circuit,
   second means for connecting the semiconductor switching element, a first coil and the parallel circuit in a series circuit across said first and second input terminals,
   a starter circuit including a resistor and a capacitor,
   third means connecting said transformer secondary winding and said capacitor in series between the control electrode and the first main electrode of the controlled semiconductor switching element, and
   fourth means connecting the resistor between the second main electrode and the control electrode of the semiconductor switching element.

2. A DC-AC converter as claimed in claim 1 further comprising:
   means for coupling the input terminals to a rectifier means including a series arrangement of a smoothing capacitor and a second resistor, and wherein said series arrangement of the second resistor and smoothing capacitor has an RC time constant that is shorter than the RC time constant of the resistor and capacitor of the starter circuit.

3. A DC-AC converter as claimed in claim 1 wherein said parallel circuit comprises a first branch that includes the lamp coil and a second branch that includes said transformer primary winding and a second capacitor thereby to form a high-frequency resonant circuit.

4. A DC-AC converter as claimed in claim 3 wherein said fourth connecting means provides a second series circuit across said first and second input terminals that includes, in series, said resistor, the first capacitor, said secondary winding, said first coil and said parallel circuit.

5. A DC-AC converter as claimed in claim 4 further comprising a second controlled semiconductor switching element connected in a third series circuit with the first semiconductor switching element across said first and second input terminals, and wherein
   said transformer includes a second secondary winding coupled to a control electrode of the second switching element via a third capacitor, said first and second secondary windings providing, in response to a current in the primary winding, switching voltages for the first and second semiconductor switching elements of a polarity to alternately trigger the semiconductor switching elements into conduction in mutually exclusive time intervals.

6. A DC-AC converter as claimed in claim 1 wherein the capacitance of the capacitor is chosen so that its impedance is low at the converter operating frequency.

7. A DC-AC converter as claimed in claim 1 wherein said parallel circuit comprises a first branch that includes the lamp coil and a second branch that includes said transformer primary winding in series with a second capacitor thereby to form a high-frequency resonant circuit that produces a high frequency oscillation current in the transformer primary winding in the operating condition of the converter.

8. A DC-AC converter as claimed in claim 7 further comprising a third capacitor connected in series with the first coil in said series circuit, and wherein the first capacitor provides a dual function, first as a starter capacitor to develop a trigger voltage for the semiconductor switching element at start up of the converter, and second to couple a high frequency control voltage from the secondary winding to the control electrode of the semiconductor switching element to produce high frequency operation of the converter.

9. A DC-AC converter as claimed in claim 7 wherein the resistor and capacitor are chosen to have a time constant that is longer than the oscillation period of said high frequency oscillation current whereby the capacitor does not produce any start pulses for the semiconductor switching element during high frequency operation of the converter.

10. A DC-AC converter for igniting and operating an electrodeless low-pressure discharge lamp having a lamp coil comprising:
first and second input terminals for connection to a source of DC voltage,
a transformer having a primary winding and a secndary winding,
a first semiconductor switching element having a control electrode,
first means for connecting said lamp coil and the transformer primary winding in a parallel circuit,
second means for connecting the semiconductor switching element, a first coil and the parallel circuit in a first series circuit across said first and second input terminals,
third means connecting a resistor, a capacitor, said transformer secondary winding, said first coil and said parallel circuit in a second series circuit across said first and second input terminals, and
means coupling the control electrode of the semiconductor switching element to said secondary winding via said capacitor whereby the capacitor provides a starting voltage to trigger the semiconductor switching element into conduction at start-up of the converter.

11. A DC-AC converter as claimed in claim 10 wherein said parallel circuit comprises a first branch that includes the lamp coil and a second branch that includes said transformer primary winding in series with a second capacitor thereby to form a high-frequency resonant circuit that produces a high frequency oscillation current in the transformer primary winding in the operating condition of the converter.

* * * * *